(12) United States Patent
Neale et al.

(10) Patent No.: US 7,217,316 B2
(45) Date of Patent: May 15, 2007

(54) COATING COMPOSITIONS

(75) Inventors: Raymond Bede Neale, Sydney (AU); Catherine Gail Fryirs, Sydney (AU)

(73) Assignee: George Weston Foods Limited, New South Wales (AU)

( * ) Notice: Subject to any disclaimer, the term of this patent is extended or adjusted under 35 U.S.C. 154(b) by 172 days.

(21) Appl. No.: 10/803,979

(22) Filed: Mar. 19, 2004

(65) Prior Publication Data

US 2004/0261659 A1 Dec. 30, 2004

(30) Foreign Application Priority Data

Mar. 21, 2003 (AU) ............... 2003901311
Feb. 26, 2004 (AU) ............... 2004900984

(51) Int. Cl.
*C09D 189/00* (2006.01)
*C09D 103/02* (2006.01)

(52) U.S. Cl. ............... 106/125.1; 106/134.1; 106/145.1; 162/174; 428/533

(58) Field of Classification Search ............ 106/125.1, 106/134.1, 145.1; 162/174; 428/533
See application file for complete search history.

(56) References Cited

U.S. PATENT DOCUMENTS 3,211,564 A 10/1965 Lauterbach
6,022,450 A * 2/2000 Van Kessel et al. ........ 162/174
6,517,625 B2 * 2/2003 Bassi et al. .............. 106/145.1

FOREIGN PATENT DOCUMENTS

| DE | 40 26 585 A1 | 3/1992 |
|---|---|---|
| EP | 1 106 173 A2 | 6/2001 |
| ES | 8705015 A | 7/1987 |
| GB | 2 026 571 | 2/1979 |
| JP | 53012154 A | 2/1978 |
| RU | 2 179 480 C1 | 2/2002 |
| WO | 00/58085 | 10/2000 |

* cited by examiner

*Primary Examiner*—David M. Brunsman
(74) *Attorney, Agent, or Firm*—Sughrue Mion, PLLC

(57) ABSTRACT

The present invention relates to an aqueous coating composition which comprises an alkali oxidised aqueous gelatinised starch/protein mixture, said composition having a viscosity between 1 and 100 centapoise (cps), and a pH from pH 7.5 to pH 9, particularly compositions wherein said alkali oxidised aqueous gelatinised starch/protein mixture comprises a solids content of from 3% w/w to 50% w/w, and processes in the preparation of the same and also processes employing the said composition in the preparation of paper or fiberboard.

56 Claims, No Drawings

COATING COMPOSITIONS

FIELD OF THE INVENTION

This invention is directed to coating compositions, in particular paper coating compositions, processes for the production of paper coating compositions, and treated paper and other products.

BACKGROUND OF THE INVENTION

Paper may be strengthened by means of adding strength agents in the paper making process, for example into the furnish at what is known as the wet end of a paper machine or as a coating at the size press unit or coater, which is situated at the dry end of the paper machine. Various types of starches are used in both applications, viz: cationic or amphoteric starches for wet end addition and oxidised or acid modified starches at the size press. Another means of adding starch to strengthen paper is to spray a starch slurry between the plys on multiwire paper machines. Casein and/or latexes have also been used at the coating end of paper machines particularly in conjunction with pigments to improve opacity, whiteness and strength.

Starch is oxidised under acid conditions in order to obtain the necessary starch hydrolysis and viscosity reduction as required in the paper industry.

Starches used in paper coating compositions, whether gelatinised, hydrolyzed, oxidised or otherwise modified, exhibit sporadic unpredictable behaviour which typically results in inconsistent coating properties associated with batch variability. For example, starch prepared from water damaged wheat may give low viscosity coatings when subject to oxidation.

Starch is an extensively chemically purified product obtained from various agro-industrial crops, including maize, potato, wheat and tapioca. For example, maize starch may be prepared from maize by steeping the maize in sodium metabisulphite to soften protein constituents. The steeped maize is then passed through a roller mill to separate protein, wet milled or ground into a starch slurry, screened to remove fibre, and then flash dried.

Starch production involves significant energy use and waste production, and is accordingly a costly processed product.

In an attempt to overcome the problems of gelatinised, hydrolysed and modified starch, Bassie et al (U.S. Pat. No. 6,517,625) describes aqueous dispersions for coating paper stock which comprise 20 to 45% by weight of a filler such as clay, calcium carbonate, talc, ungelled starch or mixtures thereof, and from 16 to 18% wheat gluten. The gluten of Bassie is reduced to cleave some of the disulfide bonds using an acidic reducing agent such as alkali metal sulfites, alkali metal bisulfites, alkali metal metabisulfites, sulfur dioxide, mercaptan and cysteine. Sodium hydroxide is added to a an aqueous solution of the gluten and then the reducing agent is added. The next step is the addition of granular starch, that is ungelatinised starch, to the dispersion. The finished composition has a pH in the range 9–12 such as pH of 9.5–11. The use of a reducing agent such as sodium metabisulphite in Bassi et al raises allergy concerns associated with sodium metabisulphite or other reducing agent residues. The costs involved in providing purified components and subsequent reduction processes according to Bassie et al are not associated with improved processes for the preparation of paper nor does it ensure the paper prepared has improved strength or durability. Furthermore, pHs above 9 in final compositions such as those described by Bassi et al disadvantageously affects paper properties, particularly paper strength.

Wheat flour has also been proposed for use as an additive at the beginning stages of paper production, particularly addition to wet pulp in the uncooked form. Retention of flour in these proposals was often less than 60% w/w, which was uneconomic.

It has also been proposed to use cooked flour at the sizing step of manufacture of paper. However, the insoluble gluten results in fouling of the paper production equipment. A further problem with these proposals is that the gluten content causes a gummy finish in the resultant paper.

U.S. Pat. No. 6,022,450 (Van Kessel et al) describes methods for manufacturing paper or cardboard from a fibre matrix and flour comprising subjecting the flour to a deamidation reaction and/or partial hydrolysis degradation treatment. Flour is mixed with ammonium persulphate under acidic conditions, achieved for example by the addition of acetic acid or citric acid. Flour degradation may also be carried out according to Van Kessel et al by treatment with amylase enzymes, or combinations of amylase enzymes with ammonium persulphate.

In comparative testing with conventional starch coatings, Van Kessel et al found that the performance properties of paper treated according to their methods were either equivalent to those properties conferred by conventional starch coating, or somewhat less effective. For example burst and breaking strength of paper treated according to the methods of Van Kessel et al were respectively 13% and 17% less effective than standard starch coating treatments.

A large number of different types of paper size compositions have been developed in attempts to increase the strength and durability of paper, and to improve printability, opacity and whiteness. For example, U.S. Pat. Nos. 5,122, 568 and 5,139,614 teach the use of styrene acrylic copolymers for enhancing sizing and ink print contrast. U.S. Pat. No. 3,562,102 discloses amine reaction products of alkyl glycidyl mixed esters for use in sizing paper substrates. U.S. Pat. No. 4,294,704 describes paper and paperboard coating compositions which contain aqueous latex binders of synthetic polymers, such as styrene-butadiene copolymers, carboxyl styrene-butadiene copolymers and the like in order to provide improved dry and wet tear resistance. U.S. Pat. No. 6,494,990 describes coating compositions based on hydrophilic polyacrylimides and various copolymers. Issues of expense and health concerns of such compositions arise. For example, polyacrylimides have been associated with neurotoxicity.

There remains a need for low cost, high performance, non-noxious paper coating compositions.

This invention has particular applicability to the end stages of paper production, for example the size press coating stage, as well as other stages of paper, paperboard and cardboard production, as well as the production of other products. Coating compositions also find use as adhesives. This invention thus has application in the adhesive field, for example in gummed tape manufacture, and as an additive to gypsum board to improve bonding of the liner to the gypsum core.

SUMMARY OF THE INVENTION

Surprisingly it has been found that alkali oxidation of protein and starch mixtures and cooking to give viscosity reduction gives rise to highly advantageous coating compositions, having particular application as paper coatings. These coatings have been found to increase the strength and durability of paper.

In accordance with a first aspect of this invention there is provided an aqueous coating composition which comprises an alkali oxidised aqueous gelatinised starch/protein-mixture, said composition having a viscosity from about 1 to about 100 centapoise (cps), preferably from about 5 to about 80, more preferably about 5 to about 60 cps, and an alkali pH from about pH 7.5 to about pH 9, preferably from about pH 7.8 to about pH 8.8.

The protein employed in the invention is plant protein, which includes protein derivable from plants.

Preferably the solids content of the composition is about 3% w/w/ to about 50%, more preferably about 3% w/w to about 30% w/w, especially about 5% w/w to about 30% w/w. Preferably the protein content of the composition is from about 4% w/w to about 50% w/w of solids, more preferably about 6% w/w to about 50% w/w, especially about 8% w/w to about 25% w/w of solids.

Preferably the starch and protein mixture is flour, or other milled or crushed grain products. Preferably the composition may be used to treat paper, for example as a paper size or paper coating composition. The compositions of the present invention dramatically increase paper strength, for example as measured by the Ring Crush test.

Preferably the aqueous coating composition in accordance with a first aspect of this invention comprises a mixture of starch and plant protein in water having a solids content of 3% w/w to 30% w/w, a protein content of 4% w/w to 50% w/w of the total solids, a viscosity of about 1 to about 100 centipoises, and a pH from about pH 7.5 to about pH 9, wherein the starch is gelatinised and both the starch and protein in the mixture are alkali oxidised at a pH from about pH 8 to about pH 13, for about 5 to about 30 minutes at a temperature of about 70° C. to about 150° C.

In accordance with another aspect of this invention there is provided a process for the production of a coating composition, for example a paper coating composition, which comprises the steps of forming a mixture of a plant protein and plant starch in water, preferably having from about 3 to 50% solids content, oxidising the mixture with an oxidising agent at alkaline pH and heating the oxidised mixture at a temperature from about 70° C. to about 150° C. until the viscosity is lowered to 1 to 100 cps. The pH of the solution is generally from pH 7.5 to pH 9 at the completion of the process. Where the pH at the completion of the process is outside this range, appropriate pH adjustment is made.

Preferably in the process the alkaline pH is from about pH 8 to about pH 13, more preferably from about pH 9 to about pH 12. Preferably the solids content of the composition is from about 3% w/w to about 30% w/w, more preferably about 5% w/w to about 30% w/w. Preferably the protein content of the composition is from about 4% w/w to about 50% w/w, more preferably 6% w/w to about 50% w/w, and especially 8% w/w to about 25% w/w of solids.

In accordance with a further aspect of this invention there is provided a process for increasing the strength and durability of paper which comprises applying to the surface of paper an aqueous coating composition which comprises an alkali oxidised gelatinised starch/protein mixture, said composition having a viscosity between 1 and 100 cps, and a pH from about pH 7.5 to about pH 9.

In a still further aspect of this invention there is provided an adhesive composition which comprises an alkali oxidised gelatinised starch/protein mixture, said composition having a viscosity between about 1 and about 100 cps, and a pH from about pH 7.5 to about pH 9.

In accordance with another aspect of the invention, there is provided a fibreboard, such as plasterboard, comprising an alkali oxidised and gelatinised starch/protein mixture, particularly as described above, incorporated within the board.

In another aspect of this invention there is provided paper coated with an aqueous coating composition which comprises an alkali oxidised aqueous gelatinised starch/protein mixture, said composition having a viscosity between about 1 and 100 centipoise (cps), and a pH from about pH 7.5 to about pH 9.

DETAILED DESCRIPTION OF THE INVENTION

Thus the invention provides a process for the production of a coating composition which comprises the steps:
(a) oxidising a mixture which comprises at least one plant protein and starch, in water at an alkaline pH; and
(b) heating the mixture concomitantly with oxidation or subsequent to oxidation to provide a composition with a viscosity from 1 to 100 centipoises, and a pH from pH 7.5 to pH 9.

The invention also provides compositions for coating paper, paperboard or cardboard obtainable by the process that is, produced by the above process.

The process provides a flowable aqueous coating composition for coating paper, paperboard or cardboard, which comprises an oxidised mixture comprising starch and protein, wherein said mixture is gelatinised and the composition has a pH from pH 7.5 to pH 9 and a viscosity from 1 to 100 centipoises.

Coating compositions according to the present invention may be used to treat paper, for example as a size composition. The compositions of the invention impart strength and durability to paper, and may also improve paper printability. Paper strength, as determined by the standard Ring Crush test (TAPPI test T822 OM-89), is advantageously increased by over 20% using the compositions of the invention.

The coating compositions may be used in coating techniques known to persons skilled in the art, for example, employing a roller coater, blade coater or wire-wound rod coater. In its broadest aspect, this invention is concerned in a first aspect with a coating composition, in particular a paper coating composition, which comprises an alkali oxidised aqueous gelatinised starch/protein mixture, said composition having a viscosity from about 1 to about 100 cps, and a pH from about pH 7 to about pH 9.

Gelatinised in the context of the application will be understood to mean that the material does not exhibit bifringence when subjected to polarised light and a nichol prism. Starch is gelatinised (i.e. starch granules ruptured) when heated at a temperature above its natural gel point (about 70° C.). Granular starch on microscopic analysis shows discrete starch granules which exhibit bifringence when subject to polarised light.

The protein may comprise plant proteins from wheat, rye, sorghum, triticale, maize, oats, barley, or other plant source. The preferred plant proteins are those capable of forming disulfide bonds on oxidation and include, for example, gluten, glutenen and zein. Plant proteins may be a mixture of one or more plant proteins. For example, the plant protein may be a zein protein from maize or plant protein from other cereals, or a mixture of plant proteins. The plant protein may comprise plant proteins extracted from plant material according to methods well known in the art. They include the extraction of gluten from wheat flour by means of washing a flour dough gently with copious amounts of water to remove the starch and leaving the protein in a gummy mass which is then dried to a powder in a ring dryer. This process in known as the Martin process and is described in U.S. Pat. No. 3,119,719. Alternatively, low water content extraction can be used, such as the process known to those skilled in the art as the Rasio process.

The starch component may comprise a plant starch from wheat, sorghum, triticale, maize, oats, barley (including waxy and high amylose starches), tapioca, potato, sago or rye. Any plant starch may be used in the invention, including waxy and high amylose versions of cereal plants particularly wheat starch, corn starch and tapioca starch. Wheat starch comprises both large and fine starch particles, both or either of which would be suitable for this use. Also starch extracted from waxy maize or other waxy grains may be used in implementing the invention.

Plant proteins and plant starches may be mixed together to give a mixture of plant starch and plant protein. Generally, the resulting mixture contains from about 4% w/w to about 20% w/w plant protein or up to as much as 50% plant protein, with the remainder comprising plant starch.

Preferably, the starch/protein mixture is flour, that is flour produced by milling grain, such as cereal grains. Protein levels in the grains may range from about 2% w/w to about 20% w/w, preferably from about 5% w/w to about 18% w/w. Flours may be produced from high or low amylose content grains, or grains having intermediate amylose content. High amylose starch generally contains in the order of 50 to 70% w/w amylose, whilst a low amylose starch generally contains in the order of 40% amylose or less. Examples of flours, which may be used in this invention, include wheat flour, sorghum flour, triticale flour, maize flour, oat flour, barley flour and rye flour. Other milled or crushed grain products such as meals (for example corn meal), grits (for example corn grits) or other plant protein/starch products may be used in this invention. Protein levels in such flours generally range from about 2 to about 20%. Plant protein may be added to flour to increase total protein levels, for example up to 50%. The plant protein may be from the same grain from which the flour was produced, or another plant protein.

Flour or other starch/protein mixtures may be mixed with water to give a solids content of from about 3% w/w to about 50% w/w, preferably 3% w/w to about 30% w/w and especially about 5% w/w to about 30% w/w. Such a mixture is generally in the form of a slurry or paste. The slurry of flour and water is readily oxidised using a conventional oxidising agent, for example as used in the oxidation of starch or flour, including a peroxide such as hydrogen peroxide, sodium hypochlorite, calcium hypochlorite or sodium perborate under alkaline conditions. The mixture may be agitated, for example by mixing during the oxidation. Alkali oxidation of flour/water mixtures may be conducted at a reaction temperature of about 25–50° C., preferably about 30 to 45° C., for about 5–30 minutes, preferably about 6 to 20 minutes, prior to cooking to assist the oxidation process. Alternatively, as mentioned below oxidation and cooking are conducted at the same time, that is, simultaneously (ie concomitantly).

Oxidation of flour and water mixtures, or for that matter any plant protein and plant starch mixture in water, is carried out under alkali conditions according to this invention, for example at a pH from about 8 to about 13, preferably a pH of about pH 9 to about pH 12. The pH is adjusted to this range by the addition of alkali, such as sodium hydroxide, potassium hydroxide or other alkali. Oxidation may be carried out in the presence of metal catalysts, such as vanadium, ferrous or copper ions. Levels of addition are from about 50 to 100 ppm. Whilst not wishing to be bound by theory it is believed that under these conditions, it is carbohydrate groups in flour, for example in starch, which in particular undergo oxidation. Protein is also oxidised. Oxidation is generally carried out from about 5 to about 150 minutes, preferably about 6 to about 120 minutes, until a viscosity of from about 1 to about 100 cps, preferably about 5 to about 80 cps, is achieved when cooked (heated) as set out below.

Alkali oxidised flour or other starch/protein mixtures are heated so as to reduce viscosity of the aqueous compositions to about 1 to about 100 cps, preferably about 5 to about 80 cps. For example, heating at a temperature of about 50 to about 150° C., preferably about 70 to about 145° C., for about 5 to about 150 minutes, preferably about 6 to about 120 minutes, will reduce the viscosity of the composition to within the desired range. The alkali oxidised mixtures may be heated in a batch cooker, for example to about 95° C., or via a jet cooker (for example up from about 140° C. to about 150° C.) whereby the starch component is reduced in viscosity to the desired level. The alkali and oxidant may also be directly injected into the flour slurry or other starch/flour mixture immediately prior to entering the jet cooker, so that the oxidation and heating step are carried out at the same time. Protein within the composition remains in solution, and in combination with gelatinised starch is found to enhance the strength benefit of the composition when coated onto paper. Advantageously the compositions of the invention are flowable, aqueous compositions, which facilitates use of the compositions.

Alkali oxidised aqueous starch/protein mixtures having a viscosity from about 1 to about 100 cps, preferably about 5 to about 80 cps, have a pH generally in the range from about pH 7.5 to about 9 at the completion of heating. The pH is more preferably within the range of about pH 7.5 to about 8.7, such as about pH 7.8 to about 8.7.

The compositions may include a range of additives that can be used to facilitate protein solubility including acetates (for example about 1–2% in flour), urea (for example about 3–5% in flour), sodium benzoate (for example about 1–2% in flour), detergents, such as sodium dodecyl sulfate (for example about 0.01–0.02% in flour), alkalis, such sodium, potassium or calcium hydroxide (for example about 0.5 to 1.5% in flour) and gums (for example about 0.05–0.1% in flour), including gums possessing carboxylic acid end groups, for example xanthan gum and guar gum etc.

The composition may include one or more antifoaming agents, for example, silicon or oil based defoamers at an amount from about 0.005% w/w to about 0.1% w/w, preferably about 0.05% w/w to about 0.1% w/w. It may also be necessary to filter the sizing agent to remove fibre.

The coating composition may be dried, for example in a ring dryer or other standard dryer, such as those used for drying starch. The dried material is readily reconstituted in water.

In accordance with another aspect of this invention there is provided a process for the production of a coating composition, for example a paper coating composition, which comprises the steps of forming a mixture of a plant protein and plant starch in water, preferably having from about 3% w/w to about 50% w/w solids content, oxidising the mixture with an oxidising agent at alkaline pH and heating the oxidised mixture at a temperature from about 70° C. to about 150° C. until the viscosity is lowered to from about 1 to about 100 cps. The pH of the solution is generally from about pH 7.5 to about pH 9 at the completion of the process. Where the pH at the completion of the process is outside this range, appropriate pH adjustment is made. Preferably the alkaline pH at which oxidation is conducted is from about pH 8 to about pH 13, especially from about pH 9 to about pH 12. Preferably the solids content of the composition is from about 3% w/w to about 30%, especially about 5% w/w to about 30% w/w. Preferably the protein content of the composition is from about 4% w/w to about 50% w/w of solids.

The process according to the invention is simple to carry out, and is readily implemented in paper mills or other commercial settings.

Whilst not wishing to be bound by theory it is thought that the alkaline oxidations results in the formation of disulfide bonds which are destroyed in earlier parts of the processing, and which in contrast to the teaching of U.S. Pat. No.

6,517,625 are believed by the inventors to be advantageous to the properties of the composition contained.

The coating composition of the present invention may be applied to paper or a paperboard, such as linerboard or corrugating medium, according to methods well known in the art for the application of size compositions, for example, in a size process roller or blade coater. For example, the compositions may be utilised in a paper making machine, for example for use as a coating at the size press unit or coater. The advantageous properties of the compositions according to the present invention minimise the problems of the machines being fouled or becoming blocked, and therefore reduces the amount of a time and costs lost as a result of these problems.

For the purpose of this invention, reference to paper includes all grades of paper as well as boards such as cardboard. Further examples of paper include recycled and non-recycled paper, kraft paper, high quality printing paper, plasterboard liners, cardboard or other fibreboard, photographic papers, and magazine paper.

In accordance with another aspect this invention relates to paper, coated with a coating composition as herein described. The paper is coated with an aqueous coating composition which comprises an alkali oxidised aqueous gelatinised starch/protein mixture, having a viscosity between about 1 and about 100 centipoises (cps) and a pH from about pH 7.5 to about pH 9.

The amount of protein/starch solution applied to the paper depends on the desired strength requirements. Levels of from about 2% w/w dry coating on fibre and up to about 30% w/w dry coating on fibre may be applied, particularly if high pigment levels are present in the coating.

The alkali oxidised aqueous gelatinised starch/protein mixtures having a viscosity from about 1 and about 100 cps, for example where the starch/protein mixture is flour, may be used as an adhesive composition, for example in the production of adhesive tapes such as gummed tape manufacture and in other industrial uses requiring adhesive properties.

In accordance with another aspect of the invention, there is provided a fibreboard, such as plasterboard or composite board or particle board, comprising an alkali oxidised and gelatinised starch/protein mixture incorporated within the board.

Processes for the production of fibreboards, for example plasterboard, comprise the steps of forming a mixture of plant protein and plant starch in water, preferably having from about 5–50% w/w solids content, oxidising the mixture with an oxidising agent at alkali pH, at about 25° C. to about 50° C. for up to 24–48 hours, preferably for about 5–30 minutes, mixing the alkali oxidised mixture with the fibreboard constituents, such as gypsum, air and wax emulsion followed by heating the resultant mixture which may be formed into sheets in an oven at a temperature of about 50° C. to about 150° C. for about 20 to about 150 minutes. The starch in the plant starch/plant protein mixture is gelatinised under these conditions. Preferably the alkali pH is from about pH 8 to about pH 13, especially about pH 9 to about pH 12.

Viscosity is conventionally measured between 5–12% w/w solids whilst the mixture is hot, for example at about 80° C.

The invention also extends to use of the compositions previously defined above for the manufacture or treatment of paper and particularly for preparing paper with increased strength and/or durability in comparison to untreated paper.

This invention will now be described with reference to the following non-limiting examples.

EXAMPLES

Example 1

Test solutions of three size coatings were prepared using (a) wheat starch, (b) ASW (Australian Standard White Wheat) flour (10.1% protein) and (c) HPF (high protein flour of 13.1% protein).

(a) The wheat starch was slurried with water to give a 10% dry solids solution and 1.0% w/w ammonium persulphate was added prior to cooking at 95° C. for 10 minutes. The pH before cooking was 6.0. After cooking the pH was 2.1, and this was adjusted to 5.2 with 1 N NaOH solution and the solids were checked with a refractometer (10.5%). A Brookfield viscosity was measured at 80° C. (waterbath) and found to be 27.5 cps (No. 1 spindle at 20 rpm).

(b) The ASW flour (protein=10.1%) was slurried with water at 40° C. to give a 10–11% dry solids mixture and 1 N NaOH solution was added to adjust the pH to 11.5. 2.6% of a 30% hydrogen peroxide solution was also added. This mixture was allowed to stand at 40° C. for 30 minutes before being cooked at 95° C. for 10 minutes. The solution was then placed in a waterbath at 80° C. and its viscosity checked with a Brookfield viscometer and found to be 17.5 cps (No. 1 spindle at 20 rpm). A pH determination gave a pH of 8.7 and solids were 11.0%.

(c) The HPF (13.1% protein flour) was prepared in the same manner as (b) above and also placed in a waterbath at 80° C. It was found to have a pH of 9.2, solids of 11.8% and a viscosity of 17.5 cps.

Sample Preparation

An untreated (ie unsized) sample of corrugating medium having a basis weight of 122 gsm (grams per square meter), was cut into strips ready for coating at two application levels using two different sizes of wire wound rods. After coating with the 80° C. size solutions, the paper samples were dried in an oven at 110° C. for 20 minutes. The samples were then placed in a controlled atmosphere room for a further 24 hours to condition prior to being sent to a paper testing laboratory for strength testing. They were also weighed carefully to calculate the exact coating application rate. The tests performed included Ring Crush, burst and concora.

These tests measure paper strength, and are well established standard tests conducted according to TAPPI (the leading technical association for the worldwide pulp, paper and converting industry) test standards. Ring Crush, burst and concora and tests are carried out according to the respective TAPPI tests T822 OM-89, T403 OM-02 and T808. The Ring Crush test is a compression test and predicts box compression properties, as well as paper strength and durability. The burst test is a test of tensile strength of paper and cardboard. Concora is a test used to estimate flat crush resistance, particularly of corrugated board. Results are shown in Table 1.

Results

To enable a viable comparison to be made, the results were recalculated in terms of percent strength increase for each one percent of coating pickup. FIGS. 1, 2 and 3 show the strength gains for each type of size coating.

The results clearly demonstrate that oxidised flour is considerably more effective than oxidised wheat starch and further, that this increase improves as the protein increases in the flour.

TABLE 1

| Paper sample No. | Rod No. Used | Percent dry coating | Coating Type | Burst Kg/sq.cm | Concora (CMT) Kgf | Ringcrush (RCT) Kgf | Comments |
|---|---|---|---|---|---|---|---|
| A1 | 25 | 8.54 | Starch | 2.57 | — | — | |
| A2 | 25 | 8.25 | Starch | — | 18.72 | 13.79 | |
| B1 | 10 | 6.36 | Starch | 2.32 | — | — | |
| B2 | 10 | 7.0 | Starch | — | 17.34 | 15.96 | |
| C1 | 25 | 8.15 | ASW | 2.71 | — | — | |
| C2 | 25 | 7.76 | ASW | — | 19.05 | 16.88 | |
| D1 | 10 | 6.0 | ASW | 2.16* | — | — | Defect in one test |
| D2 | 10 | 6.93 | ASW | — | 19.23 | 15.30 | |
| E1 | 25 | 7.48 | HPF | 2.64 | — | — | |
| E2 | 25 | 9.1 | HPF | — | 19.84 | 15.37 | |
| F1 | 10 | 6.86 | HPF | 2.55 | — | — | |
| F2 | 10 | 7.04 | HPF | — | 13.87* | 18.26* | One test only (defect) |
| G | 0 | 0 | — | 1.66 | 14.45 | 10.62 | |

Summary of Results

RCT (Ring Crush) (percent increase in RCT per percent application)

| Kgf | | |
|---|---|---|
| Starch | ASW Flour | HPF |
| 5.4 | 7.0 | 7.56 |

Compared to the control starch the ASW flour and HPF flour compositions respectively increased RCT by 29.6% and 40%.

Burst (percent increase in burst per percent application)

| Kg/cm$^2$ | | |
|---|---|---|
| Starch | ASW Flour | HPF |
| 6.34 | 7.76 | 7.96 |

Compared to control starch the ASW flour and HPF flour compositions respectively increased burst by 22.4% and 26%.

Concora (CMT) (percent increase in CMT per percent application)

| Starch | ASW Flour | HPF |
|---|---|---|
| 3.2 | 4.4 | 4.1 |

Compared to control starch ASW flour and HPF flour compositions respectively increase CMT by 37.5% and 28.1%.

The Ring Crush test in particular has been found to be an excellent indicator of paper strength.

Example 2

Coating compositions prepared from various grain flours were tested and paper strength determination carried out.

Method

The following slurries were made up and cooked to coat paper of the type 120 gms recycled corrugating medium. The papers were dried and trimmed for evaluation:

Paste 1. Wheat Starch 10% dsb (Dry Solids Basis)
  Starch 57 g, water 438 g, NaOH 4.5 g, $H_2O_2$ 2 g, and an oil based defoamer 1 ml.

Paste 2. ASW Flour 10% dsb
  ASW flour 57 g, water 436 g, NaOH 7.2 g, $H_2O_2$ 2 g and an oil based defoamer 1 ml.

Paste 3. Maize Meal 10% dsb
  Maize meal 57 g, water 430 g, NaOH 13 g, $H_2O_2$ 2 g, and an oil based defoamer 1 ml. All slurry pH was adjusted to 11.5 except for Paste 3, where pH was adjusted to 11.7 with additional NaOH.

All slurries were cooked using a Viscoamylograph (80° C. for 10 minutes at 7.0% w/w solids).

Viscosity, solids and pH were measured after the cooking and coated onto sheets, pre-weighed and cut.

Summary of Results

TABLE 2

Paste results

| Paste | pH | Viscosity (cP) | Solids (%) |
|---|---|---|---|
| Paste 1 | 9.2 | 62.5 | 9.8 |
| Paste 2 | 9 | 32.5 | 9.5 |
| Paste 3 | 8.5 | 22.5 | 7.0 |

The Ring Crush was carried out on the coated paper. Test results are set out in the table below. The test results for the Paste 2 and Paste 3 were averaged.

TABLE 3

Table of paper results

| Paste | Ring Crush Test Percent increase per 1% pick up |
|---|---|
| Paste 1. Wheat Starch | 1 |
| Paste 2. ASW flour | 3 |
| Paste 3. Maize meal | 3.1 |

These results show that compositions prepared from wheat and maize meal were particularly effective compared to wheat starch.

Example 3

The following pastes were cooked in the Viscoamylograph, then coated onto paper of the type 120 gms recycled corrugated medium.
1. Promax (High protein flour)—10% dsb with 2 gm $H_2O_2$ at pH 11.
2. ASW flour—10% dsb with 11% lupin protein with 2 gm $H_2O_2$ at pH 11.
3. ASW flour—10% dsb with 2 gm $H_2O_2$ at pH 11.
4. Tapioca starch—10% dsb with 1% ammonium peroxide on starch at pH 6. The pH dropped on cooking to pH 2, and was adjusted to pH 5 with NaOH.

Final viscosity (after cooking), pH and solids were measured before paper coating. Three papers for each paste were coated and dried to work out the pick up rate for each paste. The coated papers were tested for Ring Crush.

Summary of Results

TABLE 4

Paper coating trial

| Paste description | Final pH | Brix ° | Viscosity cP | Paper number | GSM coating on the paper | % on paper |
|---|---|---|---|---|---|---|
| 10% dsb Promax flour with Hydrogen peroxide | 8.3 | 10.5 | 17.5 | A1 | 10.02 | 7.6 |
| | | | | A2 | 9.1 | 7.0 |
| | | | | A3 | 7.4 | 5.8 |
| | | | | Ave. | 6.63 | 5.1 |
| 10% dsb ASW + 10% Lupin prot. With Hydrogen peroxide | 8.5 | 11.5 | 22.5 | B1 | 10.05 | 7.7 |
| | | | | B2 | 9.3 | 7.2 |
| | | | | B3 | 9.0 | 6.9 |
| | | | | Ave. | 7.69 | 5.91 |
| 10% dsb ASW flour with Hydrogen peroxide | 8.2 | 10.8 | 35 | C1 | 9.1 | 7.1 |
| | | | | C2 | 9.0 | 6.9 |
| | | | | C3 | 9.1 | 7 |
| | | | | Ave. | 8.03 | 6.18 |
| 10% dsb Tapioca starch with APS | 5 | 11.5 | 12.5 | D1 | 12.7 | 9.5 |
| | | | | D2 | 11.3 | 8.5 |
| | | | | D3 | 9.7 | 7.4 |
| | | | | Ave. | 11.23 | 8.47 |

| Paste description | Ring Crush Test (Kg f) ΔR per 1% pick up |
|---|---|
| 10% dsb Promax flour with Hydrogen peroxide | 0.641 |
| 10% dsb ASW + 10% Lupin prot. With Hydrogen peroxide | 0.562 |
| 10% dsb ASW flour with Hydrogen peroxide | 0.610 |
| 10% dsb Tapioca starch with APS | 0.347 |

In this experiment increases in Ring Crush values are measured with reference to untreated paper. These results show that increased paper strength is achieved with each composition. Results obtained for tapioca starch cooked with APS on the acid side that is in the pH range about 2 to about 6 as a control highlights the surprising and most advantageous benefits obtained using the composition of the invention. For example, Paste 1 increased paper strength by more than 80% when compared to the control starch of Paste 4.

Example 4

A trial under factory conditions was conducted on a recycled paper machine running 100 GSM (grams per square meter) corrugating medium.

Preparation 3 batches of the following coating composition were prepared as follows:

| | |
|---|---|
| 379 l | water (recycled, pH = 6.6) |
| 0.7 kg | ferrous sulphate |
| 1.5 kg | dry sodium hydroxide |
| 144 kg | 9.9% protein wheat flour |
| 0.01 kg | an oil based defoamer |

The above blend was thoroughly stirred to remove lumps and a dilute solution (5%) of 35% hydrogen peroxide was injected just prior to entering a jet cooker which raised the temperature to 142° C., after which dilution water was added to give a size solution of 7.2% dry solids, viscosity of 30 cps (at 80° C., 7.0% w/w solids) and a pH of 8.4. This solution was pumped to the size press recirculation system where it was further diluted to 4.3% solids with extra water. The paper machine was operated at 750 MPM (meters per minute). The paper produced was tested for Ring Crush and short span compression.

The next reel of paper was run using a standard wheat starch size at 5.8% solids, and comparative strength tests were then conducted. When a calculation was made to offset the difference in solids content of the two sizes, the modified flour size showed an increase in Ring Crush +20.2% and short span compression of +51.1% compared to the standard starch composition.

The reel of paper produced using the composition of the invention was cut into smaller reels and run as medium on a corrugator machine at 200 MPM without problem.

In terms of a financial benefit to the paper mill this showed a 29% reduction in sizing cost when allowing for the cost difference between flour and starch, and a 20% reduction in usage to provide a paper with a similar Ring Crush value.

Example 5

Pastes were made up at 8% solids and coated onto paper and tested for paper strength (Ring Crush test) in accordance with Example 2.

Paste 1. Wheat starch 45.6 g, ammonium persulphate 0.46 g and water 453.9 g (at 30° C.).
Paste 2. ASW flour (10.2% protein), 45.9 g, ammonium persulphate 0.46 g, and water 453.6 g (at 30° C.).
Paste 3. ASW flour 45.9 g, NaOH (1M) 11 g, $H_2O_2$ 1.8 g, water 441.3 g (at 30° C.). Cooking was carried out at 95° C. for 10 minutes.

Summary of Results

TABLE 5

Results on cooked pastes

| Paste | pH | Viscosity (cP) | Solids (%) |
|---|---|---|---|
| Paste 1 | 2.7 | 20 | 8.5 |
| Paste 2 | 4.2 | 97 | 7.0 |
| Paste 3 | 8.45 | 10 | 8.8 |

TABLE 6

Test results

| Paste | Ring Crush Test (percent RC per 1% pick up) |
| --- | --- |
| Paste 1 | 7.8 |
| Paste 2 | 5.65 |
| Paste 3 | 11.52 |

Coating 2, unlike coatings 1 (conventional starch) and 3 (in accordance with the invention) was cloudy with precipitated protein material.

This experiment demonstates that acid ammonium persulphate (APS) treated flour (coating 2) confers 28% less paper strength than starch treated under the same conditions (coating 1) as tested by the Ring Crush test. Flour treated according to the present invention (coating 3), being oxidised and cooked under alkali conditions, increased paper strength by 46% over the acid APS starch coating, and by 74% over the acid APS flour coating (coating 2). This is a most advantageous and unexpected result.

Oxidation of starch with APS under acid conditions reflects the prevailing conditions for starch oxidation used in the paper industry. Acid oxidation with both APS and $H_2O_2$ are used in the paper coating industry to achieve a combined acid thinning and oxidation of the starch.

Coating 2 was prepared according to Example 1 of U.S. Pat. No. 6,022,450 and the results obtained demonstrate the disadvantages of such compositions compared to conventional starch compositions used in the paper coating field.

Example 6

Plasterboard Production

The following slurry was prepared:

| | |
| --- | --- |
| 270 g | water (25° C.) |
| 171.8 g | 9.7% protein wheat flour |
| 25 g | calcium hydroxide (to pH = 11.7) |
| 0.05 g | ferrous sulphate |
| 22.45 g | 30% hydrogen peroxide |

This was allowed to react for 24 hours at 25° C. after which 1 g of sodium thiosulphate was added to mop up any unreacted peroxide and the pH was adjusted to 9.0 using 1 M sulphuric acid.

An alkaline fluidity test confirmed that at a result of 74.7 ml the product was suitable as a starch replacement in the manufacture of plasterboard. The modified flour slurry was mixed into gypsum and the boards produced were heated in an oven at 130° C. which gelled the starch in the flour. The liner to gypsum bonding was found to be as good as that produced when oxidised starch was used.

Throughout this specification and the claims which follow, unless the context requires otherwise, the word "comprise", or variations such as "comprises" or "comprising", will be understood to imply the inclusion of a stated integer or step or group of integers or steps but not the exclusion of any other integer or step or group of integers or steps.

The reference to any prior art in this specification is not, and should not be taken as an acknowledgment or any form of suggestion that that prior art forms part of the common general knowledge in Australia.

The invention claimed is:

1. A process for the production of a coating composition which comprises the steps of:
    (a) oxidising a mixture which comprises at least one plant protein and starch, in water at an alkaline pH; and
    (b) heating the mixture concomitantly with oxidation or subsequent to oxidation to provide a composition with a viscosity from 1 to 100 centipoises, and a pH from pH 7.5 to pH 9.

2. A process of claim 1, wherein the mixture has a solids content from 3% to 50%.

3. A process of claim 1, wherein the heating is performed at from 70° C. to 150° C.

4. A process of claim 1, wherein the alkaline pH of step (a) is from 8 to 13.

5. A process of claim 4, wherein the alkaline pH of step (a) is from 9 to 12.

6. The process of claim 1, wherein said protein is a plant protein selected from the group consisting of wheat, rye, triticale, maize, oats, and barley protein.

7. The process of claim 1, wherein said protein is a mixture of two or more different plant proteins selected from the group consisting of wheat, rye, triticale, maize, oats, and barley proteins.

8. The process of claim 1, wherein said starch is a plant starch selected from the group consisting of wheat, rye, sorghum, triticale, maize, oats, barley, tapioca, potato, sago and rice starch.

9. The process of claim 1, wherein said starch is selected from waxy starch and high amylose starch.

10. The process of claim 1, wherein said starch and protein mixture comprises from 4% w/w to 50% w/w plant protein.

11. The process of claim 1, wherein said starch/protein mixture is selected from the group consisting of flour, meal, grits and milled or crushed cereal grains.

12. The process of claim 11, wherein the mixture is a flour is selected from the group consisting of wheat flour, rye flour, triticale flour, maize flour, oat flour and barley flour.

13. The process of claim 12, wherein said flour has a protein content between 2% and 20%.

14. The process of claim 12, wherein an additional plant protein is added to the flour to increase protein level.

15. The process of claim 14, wherein said additional plant protein is from the same grain from which the flour was produced.

16. The process of claim 14, wherein said additional plant protein is from a different plant species from which the flour is produced.

17. The process of claim 1, wherein the starch and protein mixture comprises a solids content from 3% w/w to 50% w/w.

18. The process of claim 1, wherein said oxidation is conducted at a temperature from 25° C. to 50° C. for 5 to 30 minutes prior to subsequent heating for 5 to 150 minutes at a temperature of 50° C. to 150° C. until viscosity of the composition is from 1 to 100 centipoises.

19. The process of claim 1, wherein said composition is dried in a dryer to a flowable particulate state.

20. The process of claim 1, wherein the oxidation and heating are conducted at the same time.

21. A composition for coating paper obtainable by a process as defined in claim 1.

22. A process for coating paper comprising the step of applying a composition as defined in claim 21 to paper.

23. A process for coating paper which comprises the steps:
(a) preparing a composition for coating by a process as defined in claim 1; and
(b) applying the composition to paper.

24. A product obtainable by the process defined in claim 23.

25. A process for the production of a coating composition which comprises the steps of forming a mixture of a plant protein and plant starch in water at a solids content from 3% to 50%, oxidising the mixture with an oxidising agent at alkaline pH and heating the oxidised mixture at a temperature from 70° C. to 150° C. until the viscosity is lowered to 1 to 100 centipoises.

26. A paper coated with an aqueous coating composition which comprises an alkali oxidised gelatinised starch/protein mixture, said composition having a viscosity from 1 to 100 centipoises, and a pH between pH 7.5 and pH 9.

27. An aqueous composition for coating paper or paper board which comprises an alkali oxidised gelatinised starch and protein mixture, said composition having a viscosity from 1 to 100 centipoises (cps), and a pH from pH 7.5 to pH 9.

28. A composition of claim 27, wherein the viscosity is from 5 to 80 centipoises.

29. A composition of claim 28, wherein the viscosity is from 5 to 60 centipoises.

30. A composition of claim 27, wherein the pH is from pH 7.8 to pH 8.8.

31. The composition of claim 27, wherein said protein is a plant protein selected from the group consisting of wheat, rye, triticale, maize, oats, and barley protein.

32. The composition of claim 27, wherein the protein is a mixture of two or more different plant proteins selected from the group consisting of wheat, rye, triticale, maize, oats, and barley protein.

33. The composition of claim 27, wherein said starch comprises a plant starch.

34. The composition of claim 27, wherein said starch is a plant starch selected from the group consisting of wheat, rye, sorghum, triticale, maize, oats, barley, tapioca, potato, sago and rice starch.

35. The composition of claim 27, wherein said starch is selected from waxy starch and high amylose starch.

36. The composition of claim 27, wherein said gelatinised starch and protein mixture comprises from 6% w/w to 50% w/w plant protein.

37. A composition of claim 6, wherein said gelatinised starch and protein mixture comprises from 8% w/w to 25% w/w.

38. The composition of claim 27, wherein said starch and protein mixture is selected from the group consisting of flour, meal, grits and milled or crushed cereal grains.

39. The composition of claim 38, wherein said cereal grains are selected from the group consisting of wheat, rye, triticale, maize, oat and barley grains.

40. The composition of claim 38, wherein said flour has a protein content between 2% and 20% w/w.

41. The composition of claim 38, wherein an additional plant protein is added to the flour to increase protein level.

42. The composition of claim 41, wherein said additional plant protein is from the same grain from which the flour was produced.

43. The composition of claim 41, wherein said additional plant protein is from a different plant species from which the flour is produced.

44. The composition of claim 27, wherein said alkali oxidised aqueous gelatinised starch/protein mixture comprises a solids content of from 3% w/w to 50% w/w.

45. The composition of claim 27, wherein said alkali oxidised aqueous gelatinised starch/protein mixture is obtained by oxidising a plant starch and plant protein mixture with an oxidising agent under alkaline conditions and heating the oxidised mixture at a temperature from 70° C. to 150° C. until the viscosity is from 1 to 100 centipoises.

46. The composition of claim 45, wherein oxidation is conducted at a temperature of 25° C. to 50° C. for 5 to 30 minutes prior to heating for 5 to 150 minutes at a temperature of 50° C. to 150° C. until viscosity of the composition is from 1 to 100 centipoises.

47. The composition of claim 45, wherein oxidation is carried out under conditions of heating for a period of 5 to 150 minutes at a temperature of 50° C. to 150° C. until viscosity of the composition is from 1 to 100 centipoises.

48. The composition of claim 45, wherein oxidation and heating are conducted at the same time.

49. The composition of claim 27 which is dried in a dryer to a flowable particulate state.

50. A process for coating paper which comprises the step of applying a composition as defined in claim 27 to paper, paperboard or cardboard.

51. A product obtainable by the process of claim 50.

52. An aqueous coating composition which comprises a mixture of starch and plant protein in water having a solids content of 3% w/w to 30% w/w, a protein content of 4% w/w to 50% w/w, a viscosity of 1 to 100 centipoises, and a pH from pH 7.5 to pH 9, wherein the starch is gelatinised and both the starch and protein in the mixture are alkali oxidised at a pH from pH 8 to pH 13.

53. The process of claim 52, wherein said fibreboard constituents are selected from the group consisting of gypsum, wood particles, and fibrous constituents.

54. A fibreboard comprising an alkali oxidised and gelatinised starch/protein mixture incorporated within a fibreboard.

55. The fibreboard according to claim 54, wherein said fibreboard is selected from the group consisting of plasterboard, composite board, and particleboard.

56. A process for the production of fibreboard, which comprises forming a mixture of plant protein and plant starch in water, preferably having from 3–50% solids content, oxidising the mixture with an oxidising agent at alkali pH at 25° C. to 50° C. for 5–30 minutes or up to 24–48 hours, mixing the alkali oxidised mixture with the fibreboard constituents, followed by heating the resultant mixture which may be formed into sheets in an oven at a temperature of 50° C. to 150° C. for 20 to 150 minutes.

* * * * *